United States Patent
Jordan et al.

(10) Patent No.: US 9,555,483 B2
(45) Date of Patent: Jan. 31, 2017

(54) TOOL ACCOMMODATING REPLACEABLE BLADE

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Oak Ridge, TN (US)

( * ) Notice: Subject to any disclaimer, the term of this patent is extended or adjusted under 35 U.S.C. 154(b) by 0 days.

(21) Appl. No.: 14/544,033

(22) Filed: Nov. 17, 2014

(65) Prior Publication Data

US 2016/0136739 A1    May 19, 2016

Related U.S. Application Data

(62) Division of application No. 13/066,926, filed on Apr. 28, 2011, now Pat. No. 8,898,911.

(51) Int. Cl.
*B23B 51/00* (2006.01)

(52) U.S. Cl.
CPC .......... *B23B 51/009* (2013.01); *B23B 2251/02* (2013.01); *B23B 2251/14* (2013.01); *B23B 2251/242* (2013.01); *B23B 2260/072* (2013.01); *Y10T 408/906* (2015.01)

(58) Field of Classification Search
CPC ............... B23B 51/009; B23B 2251/02; B23B 2251/14;B23B 2251/242; B23B 2260/072; Y10T 408/906

See application file for complete search history.

(56) References Cited

U.S. PATENT DOCUMENTS

| | | | |
|---|---|---|---|
| 1,177,302 A | 3/1916 | Carski | |
| 1,348,694 A | 8/1920 | Bradley | |
| 1,425,061 A | 8/1922 | Sherman | |
| 1,508,687 A | 9/1924 | Gilley | |
| 3,645,640 A * | 2/1972 | Zukas | B23B 5/16 408/192 |
| 5,232,320 A * | 8/1993 | Tank | B23B 51/00 407/118 |
| 5,443,337 A * | 8/1995 | Katayama | B23B 27/146 407/118 |
| 5,964,033 A | 10/1999 | Wolf | |
| 2006/0101649 A1 | 5/2006 | Chen | |
| 2006/0150418 A1 | 7/2006 | Hsieh | |
| 2008/0029311 A1 * | 2/2008 | Seeley | B23B 51/009 175/413 |
| 2012/0207557 A1 * | 8/2012 | Durfee | B23B 51/009 408/223 |

* cited by examiner

*Primary Examiner* — Eric A Gates
*Assistant Examiner* — Donte Brown
(74) *Attorney, Agent, or Firm* — Michael E. McKee (57) ABSTRACT

A cutting tool utilizing a replaceable blade has a body which defines a blade-accepting pocket having an interior within which the body of the blade is nestingly accepted when inserted within the pocket and for releasable securement of the blade within the blade-accepting pocket. Furthermore, the blade-accepting pocket includes an abutment surface against which a surface of the blade body bears against when the cutting edge of the blade is moved into cutting engagement with an item being cut with the tool.

7 Claims, 5 Drawing Sheets

TOOL ACCOMMODATING REPLACEABLE BLADE

This is a divisional application of application Ser. No. 13/066,926, filed Apr. 28, 2011 and the entire disclosure of which is hereby incorporated herein by reference.

BACKGROUND OF THE INVENTION

This invention relates generally to tools having wearable cutting edges and relates, more particularly, to tools which utilize replaceable blades.

Tools to which this invention is to be compared include common hand tools having cutting edges which are susceptible to wear. If such a cutting edge is embodied within the body of the tool, the entire tool might have to be replaced when the cutting edge becomes worn or damaged. Of course, to replace the entirety of a tool in order to replace a worn or damaged cutting edge may be undesirable because of the costs involved or because of the need to break in a new tool. Examples of hand tools which commonly include cutting edges include wire cutters, wire strippers and pliers whose jaws embody a pair of opposing cutting edges which are urged into engagement with an item to be cut as the item to be cut is squeezed between the jaws.

Tools are known which utilize edge-defining blades which are intended to be replaced when worn or damaged or, in the alternative, are intended to be rotated to expose an unused cutting edge of a blade. However, the blades of such tools commonly require the use thereof of a shaft or other locking member which extends through a pre-formed hole provided in the body of the blades in order to secure the blades within the tool. An example of one such tool which utilizes replaceable blades is shown and described in U.S. Pub. No. 2006/0150418.

Among disadvantages associated with such a tool (i.e. one that utilizes a pre-formed hole through which a shaft is accepted) is that if the blade and shaft are comprised of metal and the blade comes into contact (e.g. during a cutting operation) with a live electrical wire, an arc fault, or grounding, of the wire through the blade could rapidly heat the blade and shaft to thereby effectively weld the blade and shaft together. If such a welding event occurs, the blade will be difficult, if not impossible, to remove from the tool.

It would be desirable to provide a new tool which accommodates the replacement of a worn or damaged blade without requiring that the body of the blade be provided with a pre-formed hole for securement of the blade within the tool or that the blade be secured within the tool with a shaft or other locking member which extends through a pre-formed hole provided in the blade.

Accordingly, it is an object of the present invention to provide a new and improved tool which accommodates the acceptance of a replacement blade therein.

Another object of the present invention is to provide such a tool having a blade-acceptance system which enables a worn or damaged blade to be replaced relatively quickly.

Still another object of the present invention is to provide such a tool which adequately supports a replaceable blade for use.

Yet another object of the present invention is to provide such a tool whose blade-acceptance principles are well-suited for incorporation in both hand tools and machine tools.

A further object of the present invention is to provide such a tool whose blade-acceptance system is uncomplicated in structure, yet effective in operation.

SUMMARY OF THE INVENTION

This invention resides in an improvement to a tool having a body for accepting a replaceable blade.

The improvement is characterized in that the body of the tool defines a blade-accepting pocket for nestingly accepting the replaceable blade inserted therein for releasable securement of the blade within the blade-accepting pocket.

BRIEF DESCRIPTION OF THE DRAWINGS

FIG. 9b is a top view of the tool of FIG. 9a as seen generally from above in FIG. 9a.

DETAILED DESCRIPTION OF AN ILLUSTRATIVE EMBODIMENT

Figure 1:
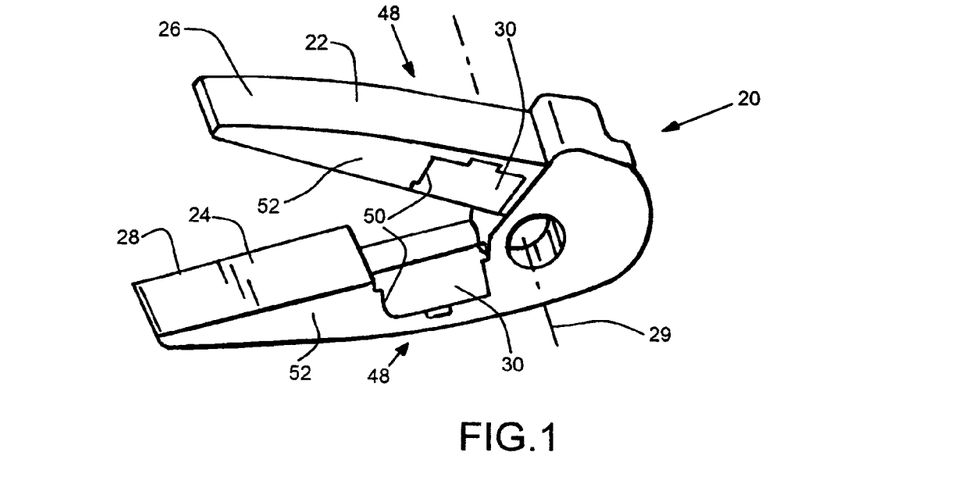
FIG. 1 is a perspective view of an embodiment of a tool within which features of the present invention are incorporated.

Turning now to the drawings in greater detail and considering first FIG. 1, there is illustrated an embodiment, generally indicated 20, of a tool within which features of the present invention are embodied. Briefly, the tool 20 is in the form of a pair of wire cutters having a body 52 including a pair of jaw portions (or jaws 22, 24) which are moveable toward and away from one another and a pair of handle portions (or handles 26, 28) which are associated with the jaws 22, 24 for movement of the jaws 22, 24 toward or away from one another. In the depicted tool 20, the handles 26, 28 are elongated in shape and are joined together at one end thereof to permit a pivotal movement of the jaws 22, 24 about a pivot axis 29 toward or away from one another as the handles 26, 28 are manipulated by a user.

More specifically, each jaw 22 or 24 of the tool 20 is incorporated within a corresponding handle 26 or 28 of the tool 20, and a spring (not shown) is mounted internal of the tool 20 for acting between the handles 26 and 28 in a manner which biases the ends of the handles 26, 28 opposite the joined ends thereof further apart. Therefore, the jaws 22 and 24 are moved toward one another as the user squeezes the handles 26 and 28 of the tool 20 toward one another in opposition to the biasing force of the internal spring of the tool 20. By comparison, the jaws 22 and 24 are permitted to move apart under the biasing influence of the internal spring as the user loosens his grip upon the handles 22, 24.

For purposes of cutting wire with the tool 20, the tool 20 utilizes a pair of cutting blades 30 which are positionable within the jaws 22, 24 of the tool 20. As best shown in FIGS. 2-5, each blade 30 includes a body 32 which is elongated in shape having a leading (substantially linear) cutting edge 34, two opposite end walls 36, 38 which extend rearwardly of the cutting edge 34 at substantially a right angle with respect thereto, a pair of side faces 40, 42 which extend between the end walls 36, 38, and a trailing, or rear, edge 44 which also extends between the end walls 36, 38 and along the blade body 32 opposite the cutting edge 34. Within the depicted blade 30, the cutting edge 34 is relatively sharp as a path is traced therealong, while each of the side faces 40, 42 and trailing edge 44 is substantially planar. Furthermore, each of the end walls 36 or 38 is rounded in shape, and one of the side faces 40 of the blade body 32 defines a shallow detent 46 in the form of a substantially semi-spherical indentation for a reason which will be apparent herein.

Figure 2:
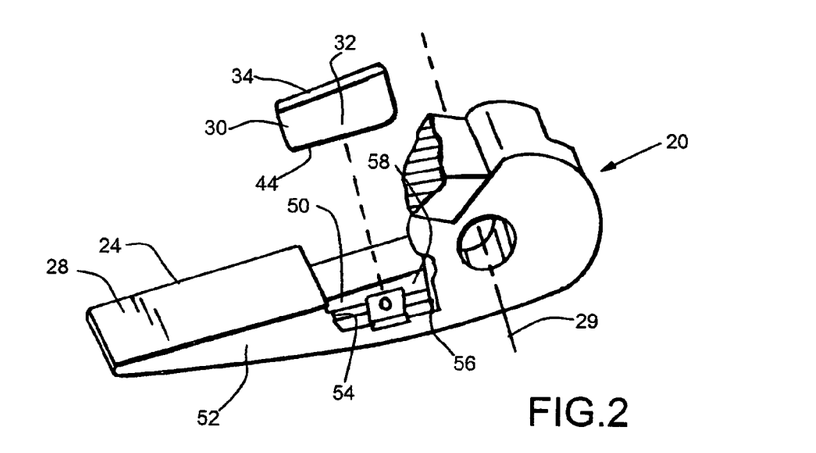
FIG. 2 is a perspective view similar to that of FIG. 1 showing one jaw and handle of the FIG. 1 tool and a replaceable blade which is utilized with the depicted tool for wire-cutting purposes.
Figure 3:
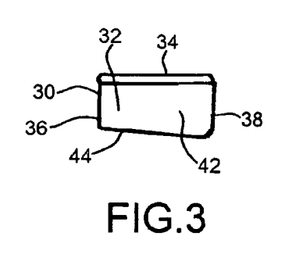
FIG. 3 is a side elevation view of the replaceable blade of FIG. 2.
Figures 4, 5:
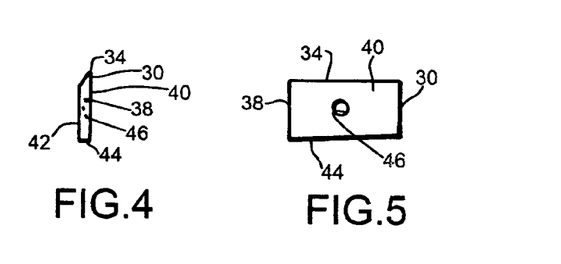
FIG. 4 is an end view of the blade of FIG. 2 as seen generally from the right in FIG. 3.
FIG. 5 is a side elevation view of the replaceable blade of FIG. 2 as seen generally from the right in FIG. 4.
Figure 6:
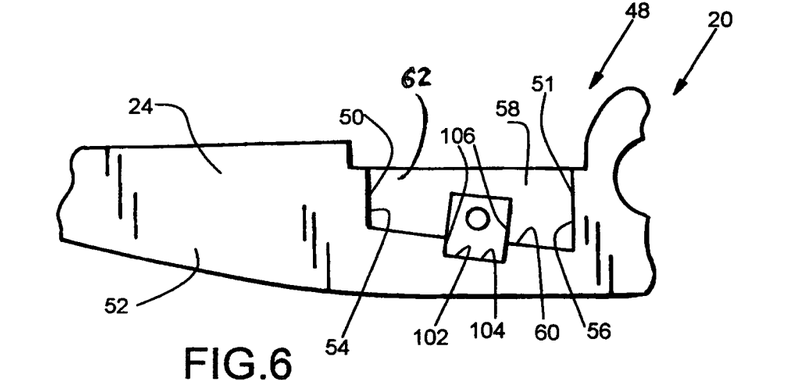
FIG. 6 is a side elevation view of a fragment of the jaw of the FIG. 1 tool.
Figure 7:
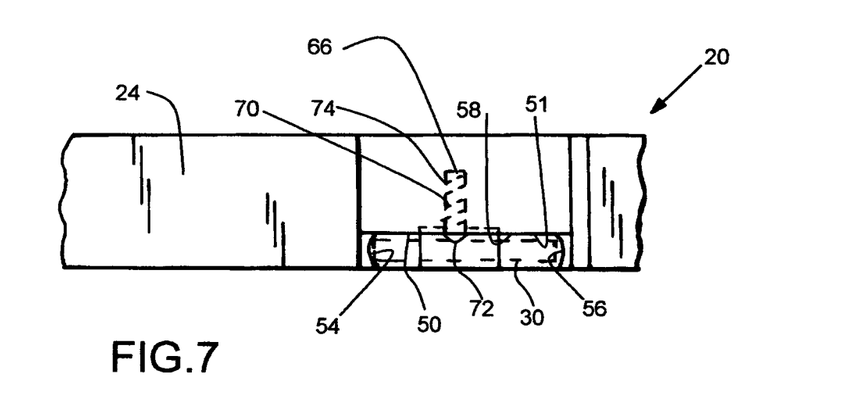
FIG. 7 is a top view of the jaw fragment of the FIG. 1 tool as seen generally from above in FIG. 6.

It is a feature of the present invention that the tool 20 includes means, generally indicated 48, defining a blade-accepting pocket 50 within which the blade 30 can be inserted for use. Although the pocket 50 can take any of a number of forms, the pocket 50 of the depicted tool 20 includes a substantially linear access passageway 51 which is collectively defined by two opposing and arcuate-shaped end walls 54, 56, a substantially planar side wall 58 which extends between the end walls 54, 56 and a substantially planar bottom 60 which extends between the end walls 54, 56. As best shown in FIG. 7, the curvature of the end walls 54, 56 provide the surfaces of the end walls 54, 56 with somewhat of a C-shaped cross section wherein the Cs of the C-shaped walls 54, 56 open toward one another. At the entrance of the access passageway 51 is provided an access opening 62 which opens generally upwardly and away from the bottom 60 of the pocket 50 (as seen in FIGS. 2 and 6).

As will be apparent herein, the two C-shaped end walls 54, 56 are substantially parallel to one another and provide guide tracks along which the rounded end walls 36 and 38 of a blade 30 are permitted to slide during a blade insertion process. In other words and to insert a blade 30 into the pocket 50, the body 32 of the blade 30 is inserted trailing edge 44-first through the access opening 62 and along the passageway 51 so that the end walls 36, 38 of the blade body 32 slide downwardly along the guide tracks formed by the surfaces of the C-shaped end walls 54, 56 of the pocket 50. The blade 30 is fully inserted within the pocket 50 when its trailing edge 44 strikes, or comes to rest upon, the bottom 60 of the pocket 50. With the end walls 36, 38 of the blade 30 positioned within the pocket 50 in this manner, the rounded end walls 36, 38 of the blade 30 are captured by, or confined between, the Cs of the C-shaped surfaces of the end walls 54, 56 of the pocket 50.

It follows from the foregoing that when fully inserted within the pocket 50, the blade 30 is nestingly accepted therein. For purposes of the present invention, the phrase "nestingly accepted" is intended to mean the acceptance of the blade body 32 by the pocket 50 so that the blade body 32 is captured within the pocket 50 (e.g. with the perimeter walls of the blade body 32 in engagement with the walls of the pocket 50) in a manner which prevents the blade 40 from moving relative to the pocket 50 along each of two coordinate axes (e.g. X and Y coordinate axes) by any appreciable amount. To this end, the cross-sectional shape of the access opening 62 can be substantially complimentary to that of the transverse cross-sectional shape of the blade body 32 so that when fully inserted within the pocket 50, the blade body 32 is closely accepted by the walls of the pocket 50 which collectively provide the access opening 62 thereof.

In the depicted tool 20, the pocket 50 is adapted to accept the body 32 of the blade 30 as the blade 30 is inserted trailing edge 44-first into the access opening 62 of the pocket 50. Thus, the perimeter walls of the blade body 32 which are nestingly accepted by the pocket 50 include the end walls 36, 38 and the side faces 40, 42 of the blade body 32. In other words, once the blade body 32 is positioned within the pocket 50 so that the trailing edge 44 of the blade body 32 rests upon, or abuts, the bottom 60 of the pocket 50, none of the end walls 36, 38 or the side faces 40, 42 are permitted to shift in directions normal to the surfaces of these end walls 36, 38 or faces 40, 42 by any measurable amount.

The blade 30 can be releasably secured within the pocket 50 (and thus prevented from inadvertently falling out of the pocket 50 by way of the access opening 62) by any of a number of means or methods, but within the depicted tool 20, the blade 30 is prevented from falling out of the pocket 50 by way of a spring-biased ball assembly 66 which is mounted within the body 52 of the tool 20 for cooperating with the blade 30 when the blade 30 is fully inserted within the pocket 50. In particular and as viewed in FIG. 7, a bore 70 is formed within the tool body 52 so as to extend part-way therethrough and so that the bore 70 opens into the pocket 50 from one side thereof. More specifically, the bore 70 opens into the pocket 50 at a location which is close to or coincident with the geographical mid-point of the pocket sidewall 58.

Also included within the ball assembly 66 is a small steel ball 72 which is positioned within the bore 70 to accommodate movement therealong and a compression spring 74 which acts between the bottom (or terminal end) of the bore 70 and the ball 72 to urge the ball 72 away from the bottom of the bore 70. When assembling the tool 20, the compression spring 74 is inserted endwise into the bore 70 and then the ball 72 is urged into the bore 70 against the biasing force of the spring 74, and then the sidewall 58 of the pocket 50 is slightly deformed (such as in a swaging process) to permit only a portion of the ball 72 to protrude from the opening of the bore 70. With the ball assembly 66 secured within the bore 66 in this manner, the compression spring 74 continually urges the ball to a position at which a portion of the ball 72 protrudes from the bore opening.

Before the blade body 32 is inserted trailing edge 44-first into the pocket 50, care should be taken to ensure that the blade side face 40 will face the pocket sidewall 58 as the blade 30 is inserted into the pocket 50. Oriented in such a manner, the trailing edge 44 of the blade body 32 can then be directed downwardly into the pocket 50 and into engagement with the portion of the ball 72 which protrudes from the bore 70, or more specifically, the opening, or mouth, of the bore 70. At that point, the trailing edge 44 slides across the bore opening and urges the ball 72 to a retracted position within the bore 70 against the biasing force of the compression spring 74 so that the blade 30 is permitted to continue to slide across the bore opening while the ball 72 is maintained in a retracted condition within the bore 70 as the blade side face 40 slides across the ball 72. When the blade body 32 is fully inserted within the pocket 50, the detent 46 provided in the side face 40 of the blade body 32 is aligned with the bore opening so that the ball 72 (or, more specifically, a portion of the ball 72), is accepted by the detent 46 for releasably securing the blade body 32 in place within the pocket 50. Although the acceptance of the ball 72 by the detent 46 is sufficient to prevent the blade 30 from inadvertent removal from, or falling out of, the pocket 50, it is not strong enough to prevent a desired removal of the blade 30 from the pocket 50 if the blade body 32 were to be forced upwardly from the bottom 60 of the pocket 50.

Although the blade-accepting pocket 50 of only one jaw 24 of the tool 20 has been described herein for accepting a blade 30, it will be understood that the other jaw 22 of the tool 20 includes an identical blade-accepting pocket 50 for nestingly accepting a blade 30 inserted within the pocket 50. Accordingly, identical components of the blade-accepting pocket 50 of the tool jaw 22 are identified within FIGS. 1 and 2 with identical reference numerals.

During a cutting operation performed with the tool 20, the jaws 22, 24 of the tool 20 are positioned in a spaced, or spread apart, condition to accommodate the insertion of an item to be cut, such a piece of wire, between the opposing cutting edges 34 of the blades 30. Once the item to be cut is positioned between the blades 30, the jaws 22, 24 are moved toward one another to bring the cutting edges 34 of the blades 30 into contact with the item. The application of sufficient (squeezing) pressure upon the jaws 22, 24 effects the cutting of the item in two pieces in what is believed to be a combination of severing and pinching actions of the cutting edges as the item is squeezed between the opposing cutting edges 34 of the blades 30. It therefore follows that during a cutting operation performed with the tool 20, forces which are applied to the item being cut by the blade are directed toward and into the item. Accordingly, the reaction forces which act upon each blade 30 by the item being cut urge each blade 30 toward the bottom 60 of its corresponding pocket 50. Thus, the relationship between the bottom 60 of the pocket 50 and the direction that cutting forces are applied to an item to be cut contributes to the securement of the blade 30 within its corresponding pocket 50 and is advantageous in this respect.

Figure 8:
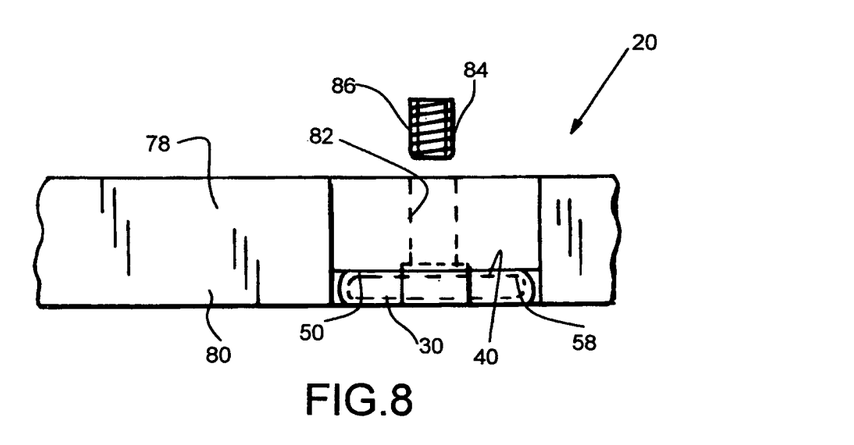
FIG. 8 is a top view similar to that of FIG. 7 of a fragment of a jaw of an alternative tool.

Although each blade 30 of the tool 20 has been shown and described as being releasably secured within its corresponding pocket 50 by way of a spring-biased ball assembly 66, there exists alternative schemes for releasably securing a blade within the interior of a blade-accepting pocket in accordance with the broader principles of the present invention. For example, there is illustrated in FIG. 8 a tool jaw, generally indicated 78, having a body 80 provided with an internally-threaded through-bore 82 which opens into the interior of the pocket 50 through the sidewall 58 thereof. As is the case with the bore 70 of the tool 20, the through-bore 82 of the tool body 80 opens into the pocket interior at a location which substantially corresponds with the geometric mid-point of the pocket sidewall 58. Threadably accepted by the through-bore 82 is a set screw 84 whose shank portion 86 can be tightened against the side face 40 of a replacement blade 30 after the blade 30 has been inserted within the pocket 50.

The set screw 84, whose head is accessible through the tool body 80 through the side thereof opposite the pocket 50, is withdrawn from (i.e. backed away from) the pocket interior to accommodate the insertion of a replacement blade 30 into the pocket interior, and upon insertion of the blade 30 into the pocket 50, the set screw 84 is appropriately rotated so that the set screw is tightened against the blade side face 40. With the set screw 84 tightened against the blade 30 in this manner, the blade 30 cannot be dislodged from or fall out of the pocket 50 through the access opening 62 thereof. It also follows that in order to remove the blade 30 from the pocket interior through the access opening 62 will require that the set screw 84 be loosened from the blade side face 40.

Figure 9A:
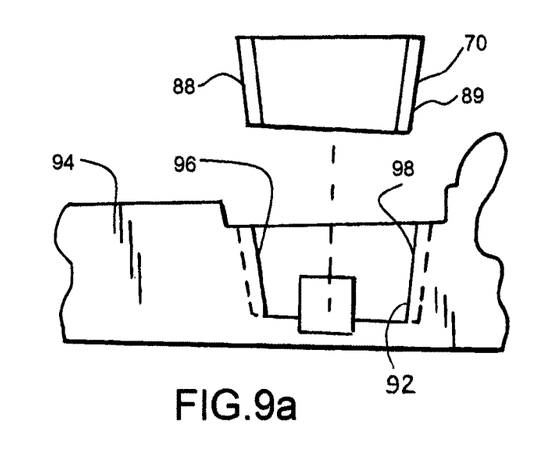
FIG. 9a is a side elevation view similar to that of FIG. 6 of a fragment of another alternative tool and a replacement blade adapted to be accepted by the blade-accepting pocket of the tool.
Figure 9B:
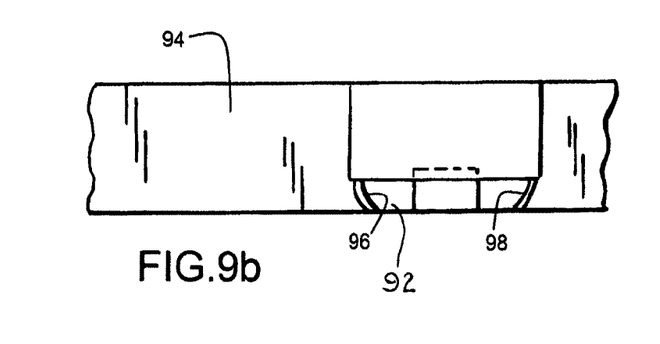

Furthermore, there is depicted in FIGS. 9a and 9b an alternative scheme for releasably securing a replaceable blade 90 within the interior of a blade-accepting pocket 92 of a tool, indicated 94. Within the FIG. 9 tool 94, the opposing end walls, indicated 96, 98, of the blade-accepting pocket 92 are tapered slightly inwardly toward one another as a path is traced downwardly along the pocket 92 from the access opening thereof so that upon full insertion of the blade 90 into the pocket 92, the opposite sidewalls, indicated 88, 89 in FIG. 9a, of the blade 90 become wedged between the opposing end walls 96, 98 of the pocket 92 to releasably secure the blade 90 within the pocket 92. In other words, the blade-accepting pocket 92 of the tool 94 is sized to frictionally grip the perimeter surfaces of the blade 90 when the blade 90 is nestingly accepted by the pocket 92 so that the blade 90 is prevented from easily dislodging from the pocket 92 because of the frictional-gripping engagement between the inner surfaces of the pocket 92 and the perimeter surfaces of the blade 92.

Figure 10:
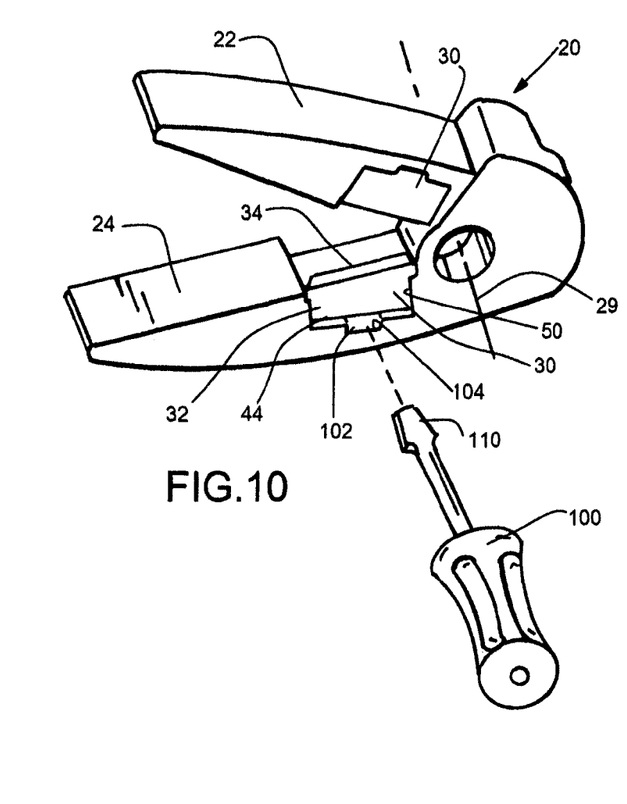
FIG. 10 is a perspective view of the tool of FIG. 1 and a screwdriver which can be used to remove the blade from the tool.

It is also a feature of the present invention that there is associated with each blade-accepting pocket of a tool, like that of the FIG. 1 tool 20, a slot 102 which facilitates the removal of a blade from the interior of a pocket with another tool, such as a flat-tipped screwdriver 100 (FIG. 10). In this connection and as best depicted in FIG. 6, such a slot 102 can be U-shaped in form having a base 104 and two spaced-apart legs 106 which extend from the base 104 and toward the interior of the pocket 50. More specifically, the U-shaped slot 102 opens into, and is in communication with, the interior of the pocket 50 and the base 104 of the slot 102, which is preferably flat, is substantially parallel to the bottom 60 of the pocket 50.

When it is desired to remove a blade 30 from the tool pocket 50 and which reference to FIG. 10, the tipped end 110 of a flat-tipped screwdriver 100 can be inserted endwise into the slot 102 to position the tipped end 110 between the base 104 of the U-shaped slot 102 and the trailing edge 44 of the blade 30. The screwdriver 100 can thereafter be twisted (i.e. rotated) one-quarter of a turn about its longitudinal axis so that the tipped end 110 acts between the slot base 104 and the trailing edge 44 of the blade 30 to force the trailing edge 44 to move away from the bottom 60 of the pocket 50. Once moved away from the bottom 60 of the pocket 50, the blade 30 can either be grasped with the fingers or between the jaws of a pair of pliers to manually lift the blade 30 from the pocket 50.

Figure 11:
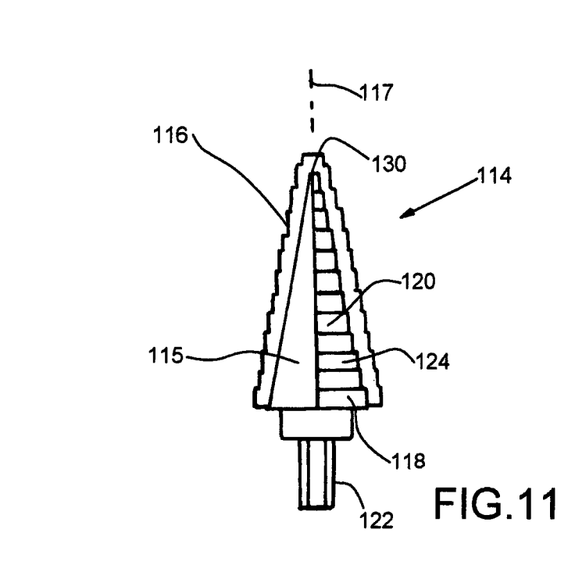
FIG. 11 is an elevation view of one more tool within which features of the invention are incorporated.
Figure 12:
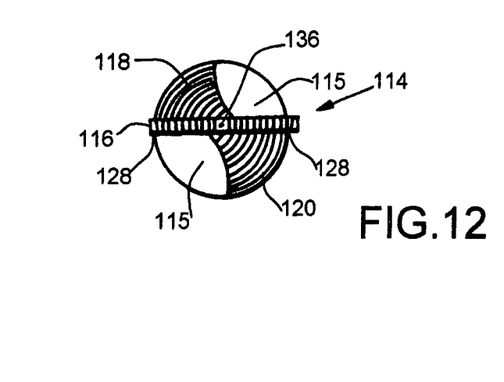
FIG. 12 is a plan view of the tool of FIG. 11 as seen from above in FIG. 11.
Figure 13:
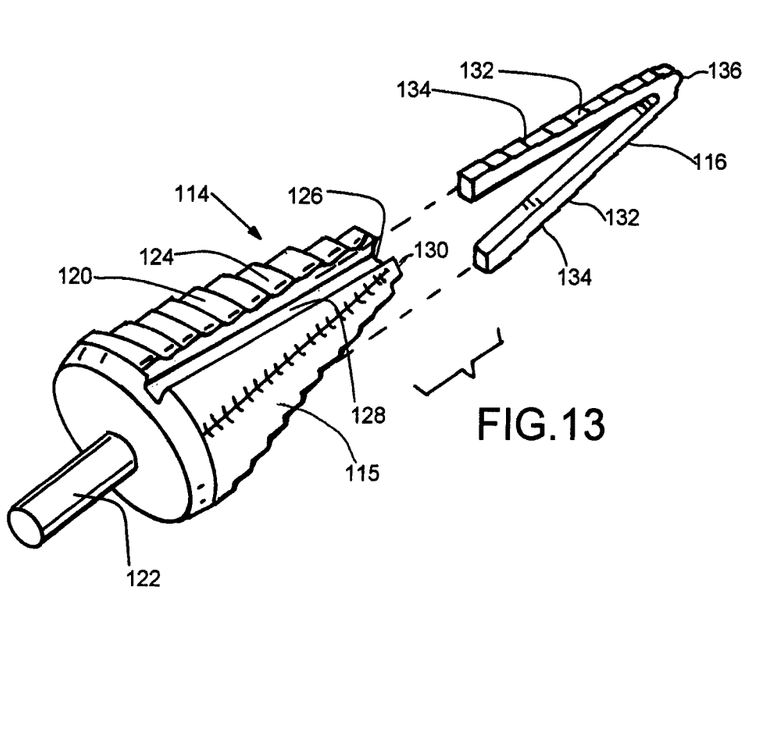
FIG. 13 is a perspective view of the FIG. 11 tool and cutting blade, shown exploded.

With reference to FIGS. 11-13, there is depicted an alternative tool, generally indicated 114, for cutting holes in sheet metal and which incorporates the principles of the present invention and a blade 116 which cooperatively interfits with the tool 114 to accommodate a cutting operation with the blade 116 as the blade 116 is rotated about an axis 117. In this connection and as best shown in FIG. 13, the tool 116 is in the form of a tool holder 118 which includes a conical end portion 120 and a shank portion 122 which is joined to the conical end portion 120 and which enables the holder 118 to be firmly held within the chuck (not shown) of a rotatable device, such as a drill. Meanwhile, the conical end portion 120 has a body 124 within which is defined a blade-accepting pocket 126 provided by a pair of shallow notches 128 wherein each notch 128 extends linearly along the conical end portion 120 from the tip, indicated 130, of the conical end portion 120. Each of these notches 128 are substantially rectangular in cross section and open tangentially of the conical end portion 120. The tool 114 can also be provided with a groove 115 which extends axially along the length of the conical end portion 120 to promote the removal of cut material away from the workpiece being cut with the tool 114.

The blade 116 which is intended to the used with the conical end portion 120 is best shown in FIG. 13 and is V-shaped in form and has substantially linear leg portions 132 which are substantially rectangular in cross section and which are joined to one another along an apex 136. Furthermore, the blade 116 has cutting edges 134 which extend along the outer periphery of the leg portions 132 of the V-shaped form of the blade 116. To install the blade 116 within the tool 114, the blade 116 is oriented so that the interior of its V-shape is positioned in registry with the conical end portion 120 as depicted in FIG. 13 so that the linear leg portions 132 are aligned with the notches 128 defined along the outer surfaces of the conical end portion 124. The blade 116 is then moved toward the tip 130 of the conical end portion 120 of the tool 114 so that the underside surfaces of the leg portions 132 of the blade 116 are slidably accepted by the notches 128 provided along the length of the conical end portion 120. The blade 116 continues to be urged along the length of the notches 128 until the underside of the leg portions 132 are fully accepted along the length of the notches 128. At that point, the shank portion 122 of the tool 114 can be mounted within the chuck of a rotatable device, rotated by the device along the longitudinal axis of the tool 14 and thereafter moved in a manner which brings the cutting edges 134 of the blade 116 into cutting engagement with an item (e.g. a piece of sheet material) to be cut.

It follows from the foregoing that tools have been described wherein each tool possesses a body for accepting a replaceable cutting blade inserted therein and wherein the cutting blade includes a body defining a cutting edge. The body of the tool defines a blade-accepting pocket for nestingly accepting the replaceable blade inserted therein for use of the cutting edge of the blade. In one such embodiment of the tool, the notch defines an abutment surface against which the blade is positioned so that as the blade is moved into cutting engagement with an object to be cut, the reaction forces exerted upon the blade by the object during a cutting operation are opposed by the abutment surface and help to hold the blade within the pocket.

Furthermore and in instances in which a cutting tool which incorporates the principles of the present invention are used to cut live electrical wire, the absence of a metal shaft which extends through the blade reduces the likelihood that the blade will become permanently lodged within the blade-accepting pocket if, for example, the blade were to be excessively heated (i.e. melted) from an arc fault, or grounding, of the wire through the blade.

Figure 14:
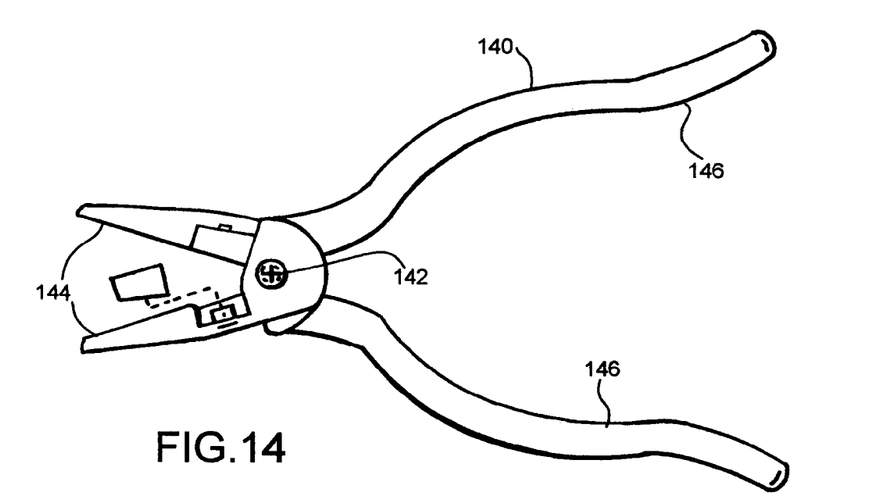
FIG. 14 is a plan view of still one more tool within which features of the invention are incorporated.

It will be understood that numerous modifications and substitutions can be had to the aforedescribed embodiment without departing from the spirit of the invention. For example, although a blade-accepting pocket 50 has been shown and described within the tool 20 of FIGS. 1 and 2 as being embodied within the jaw of a tool which is disposed on the same side of the pivot axis as are the handles of the tool, a blade-accepting pocket can be disposed on the side of a pivot axis opposite the handles of the tool. For example, there is illustrated in FIG. 14 an example of a needle-nose pliers 140 having a pair of jaws 144 and handles 146 which are joined to one another for movement about a pivot axis 142 disposed generally between the jaws 144 and the handles 146. In this set of pliers 140, blade-accepting pockets 148 for holding blades 149 are provided in the jaws 144 so as to be positioned to one side of the pivot axis 142 opposite the handles 146.

Figure 15:
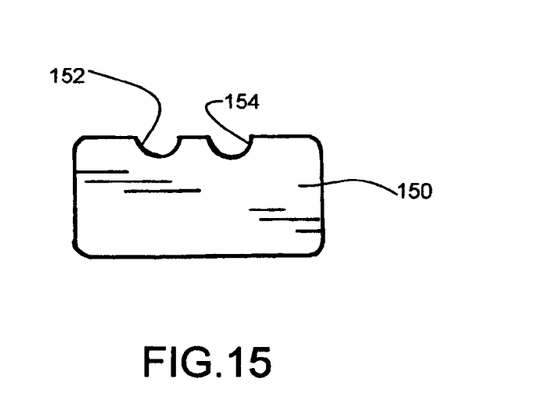
FIG. 15 is a side elevation view, similar to that of FIG. 3, of another blade which can be inserted within a tool comparable to that of FIG. 1 for wire-stripping purposes.

Furthermore and although the blades of the aforedescribed tools have seen shown and described as being used for severing an item, such a wire, in two pieces, a blade can be inserted within the blade-accepting pocket which is intended for other purposes. For example, there is illustrated in FIG. 15 a blade 150 which possesses a size comparable to that of the blade 30 of FIGS. 3-5 to permit the use of the blade 150 within the blade-accepting pocket 50 of the FIG. 1 tool 20, but instead of possessing a leading cutting edge 34, the blade 150 can possess any of a number of multiple arcuate-shaped cutting edges, such as cutting edges 152 and 154 which define with a companion blade mounted within the opposite tool 22 a wire stripper capable of stripping insulation off of a wire, such as an electrical wire, which possesses an insulating (e.g. plastic) sheath along its length. It also follows that the openings 152, 154 can possess different sizes for purposes of stripping the insulation from electrical wires of different sizes.

Accordingly, the aforedescribed embodiments are intended for the purpose of illustration and not as limitation.

The invention claimed is:
1. In a rotatable cutting tool having a body for accepting a replaceable cutting blade, the improvement comprising:
the body of the tool is elongated in shape and has a longitudinal axis and which is adapted to be rotated about its longitudinal axis during a cutting operation performed with the tool, and the body of the tool further includes a conical portion having a leading tip end and a cross-sectional width which increases in size as a path is traced rearwardly along the sides of the conical portion from the leading tip end and the conical portion defines a blade-accepting pocket within which the replaceable blade is nestingly accepted for use of the blade within the tool wherein the blade-accepting pocket includes a pair of notches wherein each notch extends substantially linearly and rearwardly along the sides of the conical portion from the tip end thereof and includes inner surfaces, and the notches communicate with one another at the tip end of the conical portion and collectively provide a forwardly-opening access passageway for nestingly accepting the replaceable blade for use with the cutting tool; and
the replaceable cutting blade utilized with the cutting tool includes a body which is substantially V-shaped in form having an apex and a pair of substantially linear leg portions which are joined at the apex and each of the linear leg portions includes a cutting edge, a pair of side faces which extend rearwardly of the cutting edge and a trailing edge which extends between the pair of side faces and along the blade body opposite the cutting edge wherein the replaceable blade mist be inserted trailing-edge first into the blade-accepting pocket of the cutting tool body so that one of the linear leg portions of the body of the replaceable blade is accepted by and extends along one of the pair of notches and so that the other of the linear leg portions of the body of the replaceable blade is accepted by and extends along the other of the pair of notches, and the inner surfaces of the notches are provided entirely by the body of the cutting tool so that when the replaceable blade is nestingly accepted by the blade-accepting pocket, the inner surfaces of the notches frictionally grip the leg portions of the replaceable blade so that the replaceable blade is releaseably secured within the blade-accepting pocket by way of only the inner surfaces of the notches of the blade-accepting pocket.

2. The improvement as defined in claim 1 wherein the access passageway has a cross-sectional shape, and the blade has a cross-sectional shape which substantially conforms to the cross-sectional shape of the access passageway so that when the replaceable blade is inserted into the blade-accepting pocket, the replaceable blade is captured by the access passageway.

3. The improvement as defined in claim 2 wherein the tool further includes means for releasably securing the blade in its nested relationship within the blade-accepting pocket to prevent the blade from being inadvertently removed from the blade-accepting pocket.

4. The improvement as defined in claim 1 wherein the tool defines an abutment surface against which the trailing edge of the blade is positionable when the blade is fully inserted within the blade-accepting pocket so that as the cutting edge of the blade is moved into cutting engagement with the item to be cut, the blade is backed by the bottom of the blade-accepting pocket.

5. In combination,
   a replaceable blade; and
   a cutting tool having a body which is elongated in shape and has a longitudinal axis and which is adapted to be rotated about its longitudinal axis during a cutting operation performed with the tool, and the body of the tool further includes a conical portion having a leading tip end and a cross-sectional width which increases in size as a path is traced rearwardly along the sides of the conical portion from the leading tip end and the conical portion defines a blade-accepting pocket within which the replaceable blade is nestingly accepted for use of the blade with the tool wherein the blade-accepting pocket includes a pair of notches wherein each notch extends substantially linearly and rearwardly along the sides of the conical portion from the tip end thereof and includes inner surfaces which oppose one another, and the notches communicate with one another at the tip end of the conical portion and collectively provide an access passageway for nestingly accepting the replaceable blade for use with the cutting tool; and
   the replaceable blade is used with the cutting tool for cutting an item desired to be cut and includes a body which is substantially V-shaped in form having an apex and a pair of substantially linear leg portions which are joined at the apex and each of the linear leg portions includes a leading cutting edge, a pair of side faces which extend rearwardly of the leading cutting edge and a trailing edge which extends between the pair of side faces and along the blade body opposite the leading cutting edge; and the access passageway has a cross-sectional shape for nestingly accepting the replaceable blade so that when positioned therein, the blade is captured by the access passageway and wherein the replaceable blade must be inserted trailing-edge first into the access passageway of the blade-accepting pocket so that one of the linear leg portions of the body of the replaceable blade is accepted by and extends along one of the notches and so that the other of the linear leg portions of the body of the replaceable blade is accepted by and extends along the other of the notches, and the inner surfaces of the notches are provided entirely by the body of the cutting tool so that when the replaceable blade is nestingly accepted by the blade-accepting pocket, the inner surfaces of the notches which oppose one another frictionally grip the leg portions of the replaceable blade so that the replaceable blade is releaseably secured within the blade-accepting pocket by way of only the inner surfaces of the notches of the blade-accepting pocket.

6. The combination of claim 5 wherein the inner surfaces of the access passageway are shaped substantially complimentary to the transverse cross-sectional shape of the replaceable blade.

7. A rotatable cutting tool which utilizes a replaceable cutting tool including a body which is substantially V-shaped in form having an apex and a pair of substantially linear leg portions which are joined at the apex and each of the linear leg portions includes a leading cutting edge, a pair of side faces which extend rearwardly of the leading cutting edge, and a trailing edge which extends between the pair of side faces and along the blade body opposite the leading cutting edge, said cutting tool comprising:
   a body which is elongated in shape and has a longitudinal axis and which is adapted to be rotated about its longitudinal axis during a cutting operation performed with the tool, and the body of the tool further includes a conical portion having a leading tip end and a cross-sectional width which increases in size as a path is traced rearwardly along the sides of the conical portion from the leading tip end and the conical portion defines a blade-accepting pocket within which the replaceable blade is nestingly accepted for use of the blade with the tool wherein the blade-accepting pocket includes a pair of notches wherein each notch extends substantially linearly and rearwardly along the sides of the conical portion from the tip end thereof and includes inner surfaces which oppose one another, and the notches communicate with one another at the tip end of the conical portion and collectively provide a forwardly-opening access passageway for nestingly accepting the replaceable blade for use with the cutting tool and
   so that in order for the replaceable blade to be accepted by the blade-accepting pocket of the cutting tool body, the replaceable blade is inserted trailing-edge first into the forwardly-opening access passageway of the blade-accepting pocket so that one of the linear leg portions of the body of the replaceable blade is accepted by and extends along one of the pair of notches and so that the other of the linear leg portions of the body of the replaceable blade is accepted by and extends along the other of the pair of notches, and the inner surfaces of the notches are provided entirely by the body of the cutting tool so that when the replaceable blade is nestingly accepted by the blade-accepting pocket, the inner surfaces of the notches which oppose one another frictionally grip the leg portions of the replaceable blade so that the replaceable blade is releaseably secured within the blade-accepting pocket by way of only the inner surfaces of the notches of the blade-accepting pocket.

\* \* \* \* \*